US009699162B2

(12) United States Patent
Faith et al.

(10) Patent No.: US 9,699,162 B2
(45) Date of Patent: Jul. 4, 2017

(54) PERSONAL AREA NETWORK

(71) Applicant: VISA INTERNATIONAL SERVICE ASSOCIATION, Foster City, CA (US)

(72) Inventors: Patrick Faith, Foster City, CA (US); Theodore Harris, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 14/737,267

(22) Filed: Jun. 11, 2015

(65) Prior Publication Data
US 2015/0350180 A1 Dec. 3, 2015

Related U.S. Application Data

(63) Continuation of application No. PCT/US2015/033214, filed on May 29, 2015.

(60) Provisional application No. 62/005,504, filed on May 30, 2014.

(51) Int. Cl.
*H04L 29/06* (2006.01)
(52) U.S. Cl.
CPC .......... *H04L 63/08* (2013.01); *H04L 63/0807* (2013.01); *H04L 63/10* (2013.01); *H04L 63/105* (2013.01)

(58) Field of Classification Search
CPC .... G06Q 20/40; G06Q 20/401; G06Q 20/385; G06Q 20/322; G06Q 20/227; A61B 5/00; A61B 3/113; A61B 5/165; A61B 5/024; A61B 5/0533; A61B 2560/0242; A61B 5/1176; A61B 5/107; G06F 17/30; G06F 7/00

USPC ................ 726/9, 21–27; 713/185, 187, 188; 705/44; 707/603
See application file for complete search history.

(56) References Cited

U.S. PATENT DOCUMENTS

| 8,639,629 B1 | 1/2014 | Hoffman |
| 8,972,339 B2 * | 3/2015 | Aparicio, IV ....... G06K 9/6298 707/603 |
| 2005/0281237 A1 | 12/2005 | Heinonen et al. |
| 2008/0183714 A1 | 7/2008 | Nakhjiri |
| 2009/0164275 A1 | 6/2009 | Chen et al. |
| 2010/0010317 A1 * | 1/2010 | De Lemos ............. A61B 3/113 600/300 |

(Continued)

FOREIGN PATENT DOCUMENTS

WO 03060449 A1 7/2003

OTHER PUBLICATIONS

International Searching Authority, International Search Report and Written Opinion in International Application No. PCT/US15/33214, mailed Sep. 2, 2015, 7 pages.

(Continued)

*Primary Examiner* — Thanhnga B Truong
(74) *Attorney, Agent, or Firm* — Loeb & Loeb LLP

(57) ABSTRACT

An entity may store various levels of sensitive and personal data in a secure computing environment. The entity may create permission rules which allow the data to be shared or not shared depending on the circumstances and situation. As an entity such as a human moves through life, the entity may be in touch with numerous electronic devices that act like sensors. The entity may share a token which may allow a sensor or operator of the sensor to access various levels of the sensitive data stored in the secure computing environment.

17 Claims, 10 Drawing Sheets

(56) References Cited

U.S. PATENT DOCUMENTS

| | | | |
|---|---|---|---|
| 2010/0185871 A1 | 7/2010 | Scherrer et al. | |
| 2012/0249749 A1* | 10/2012 | Stavnitzky | G01B 21/20 |
| | | | 348/47 |
| 2013/0252583 A1 | 9/2013 | Brown et al. | |
| 2013/0268766 A1* | 10/2013 | Schrecker | G06F 21/34 |
| | | | 713/185 |
| 2014/0143145 A1* | 5/2014 | Kortina | G06Q 20/401 |
| | | | 705/44 |

OTHER PUBLICATIONS

International Search Report and Written Opinion for PCT/US2015/033214, dated Dec. 6, 2016.

\* cited by examiner

NAME

ADDRESS

PHYSICAL CHARACTERISTICS

INTERESTS

PAYMENT

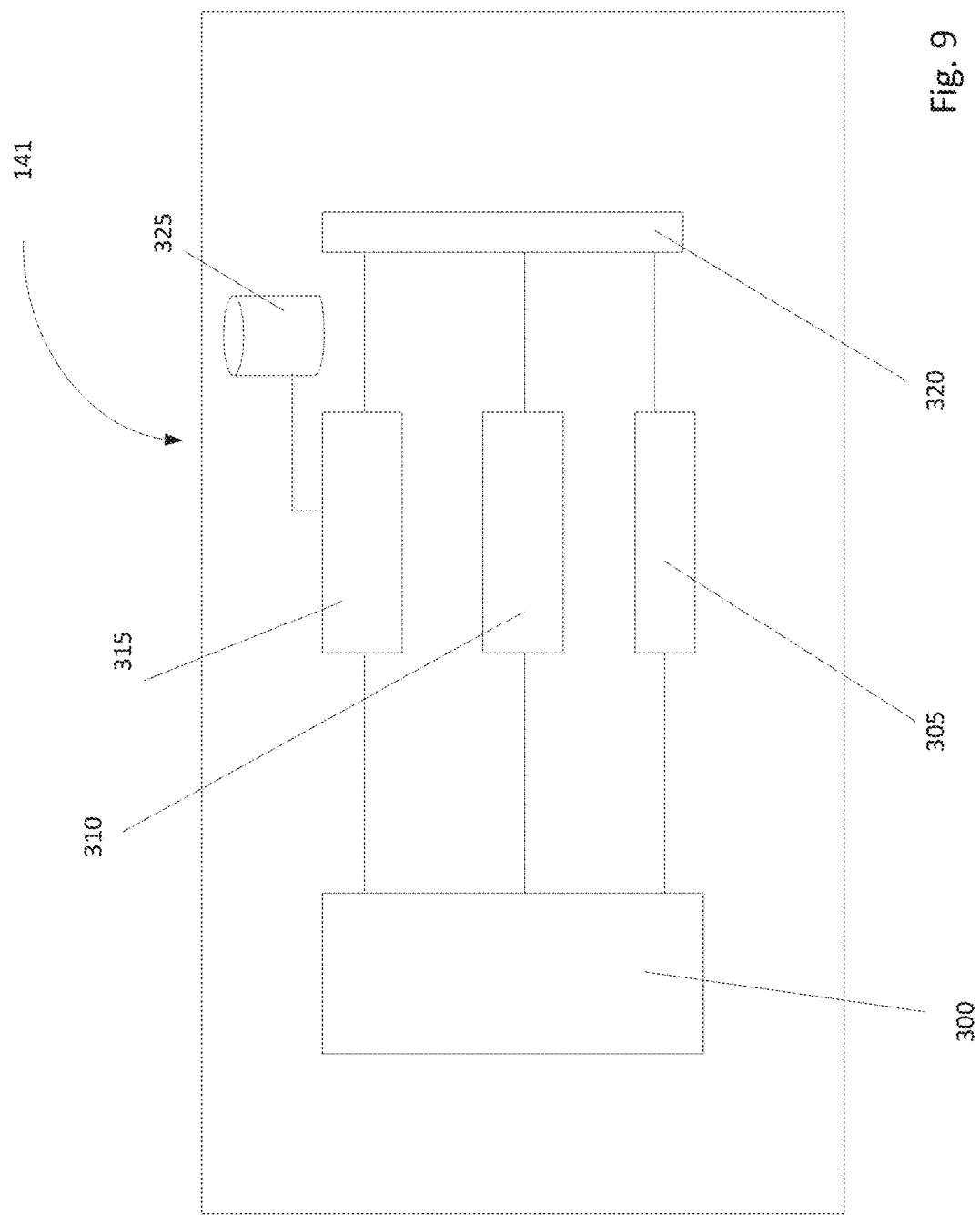

PERSONAL AREA NETWORK

PRIORITY

This application is a continuation of International Application No. PCT/US2015/33214, filed May 29, 2015, which claims the benefit of U.S. Provisional Application No. 62/005,504 filed May 30, 2014.

BACKGROUND

In the past, entities that desired to make payments would use a payment device such as a credit card or a debit card. The payment device would have account numbers on it and these account number would be read by a vendor and verified by a trust party such as a card issuer. However, ensuring security for payment devices has become increasingly complex especially with more transactions being made over a network and a vendor not being able to physically examine a card and card holder to determine fraud. In addition, people that commit fraud have become more technically savvy.

In addition, as people use networks more, the ability to control data that relates to them has diminished. Network sites collect relevant data on users and use that data to target communications to the user without compensating the user for allow his/her data to be used. Finally, some users may be fine sharing data with certain network sites and not others and the decision whether to share data may be influenced by how much someone is willing to pay to obtain the data.

SUMMARY OF THE INVENTION

A new system, process and method of controlling data related to an entity is disclosed. An entity may store various levels of sensitive and personal data in a secure computing environment. The entity may create permission rules which allow the data to be shared or not shared depending on the circumstances and situation. As an entity such as a human moves through life, the entity may be in touch with numerous electronic devices that act like sensors such as wireless networks, photonic networks, Bluetooth networks, sound recorders, scent recorders, video recorders, etc. The entity may share a token which may allow a sensor or operator of the sensor to access various levels of the sensitive data stored in the secure computing environment.

BRIEF DESCRIPTION OF THE DRAWINGS

FIG. 5a illustrates an input display for adding personal data to the trusted computing system;

FIG. 9 illustrates a server type computing device.

SPECIFICATION

Figure 1:
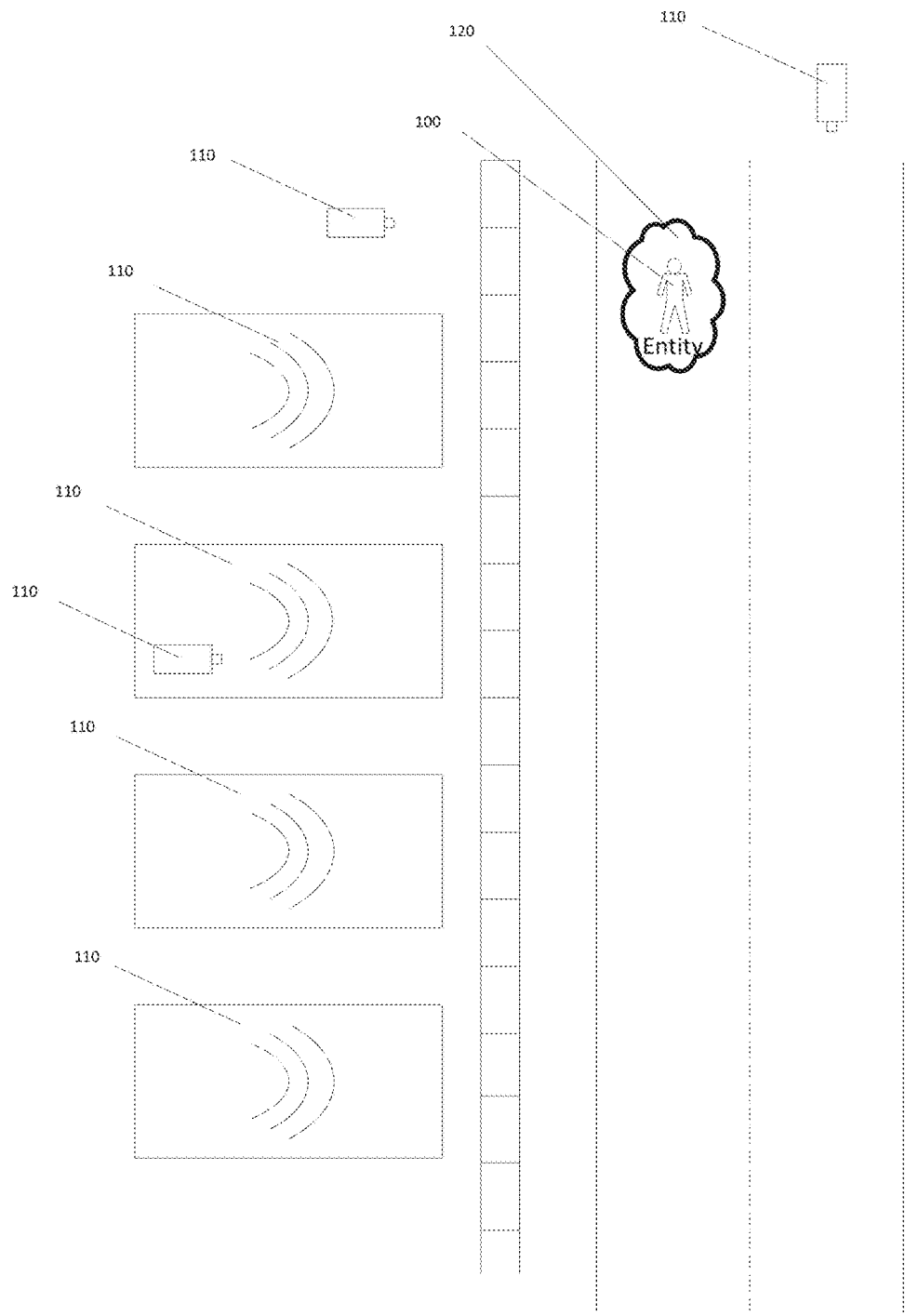
FIG. 1 illustrates a sample illustration of the sensors an entity may encounter.

At a high level, a new system, process and method of controlling data related to an entity is disclosed. As illustrated in FIG. 1, as an entity 100 such as a human moves through life, the entity 100 may be in touch with numerous electronic devices that act like sensors 110 such as wireless networks, photonic networks, Bluetooth networks, sound recorders, scent receivers, video recorders, etc. Further, each of these sensors 110 are taking the data and trying to match it up with additional data on the entity 100 to create a profile on the entity 100 which may be useable for marketing, all without explicit permission from the entity 100.

Personal Network

A personal network 120 attempts to address the problem of controlling access to sensitive data about an entity 100. An entity 100 may create a list of sensors 110, networks or operators of networks which the entity 100 is willing to communicate additional information. In addition, an entity 100 may also set thresholds for receiving offers from sensors 110 in order to exchange additional information. As illustrated in FIG. 1, while moving through life, many sensors 110 may be encountered, from red light cameras to Bluetooth networks to wireless 802.11 type networks. For networks which the entity 100 has allowed, a token from the entity 100 may be communicated to a trusted source where the desired information may be communicated to the network and the communication may again be in the form of a token. The token may contain sufficient data to enable a purchase transaction.

Figure 2:
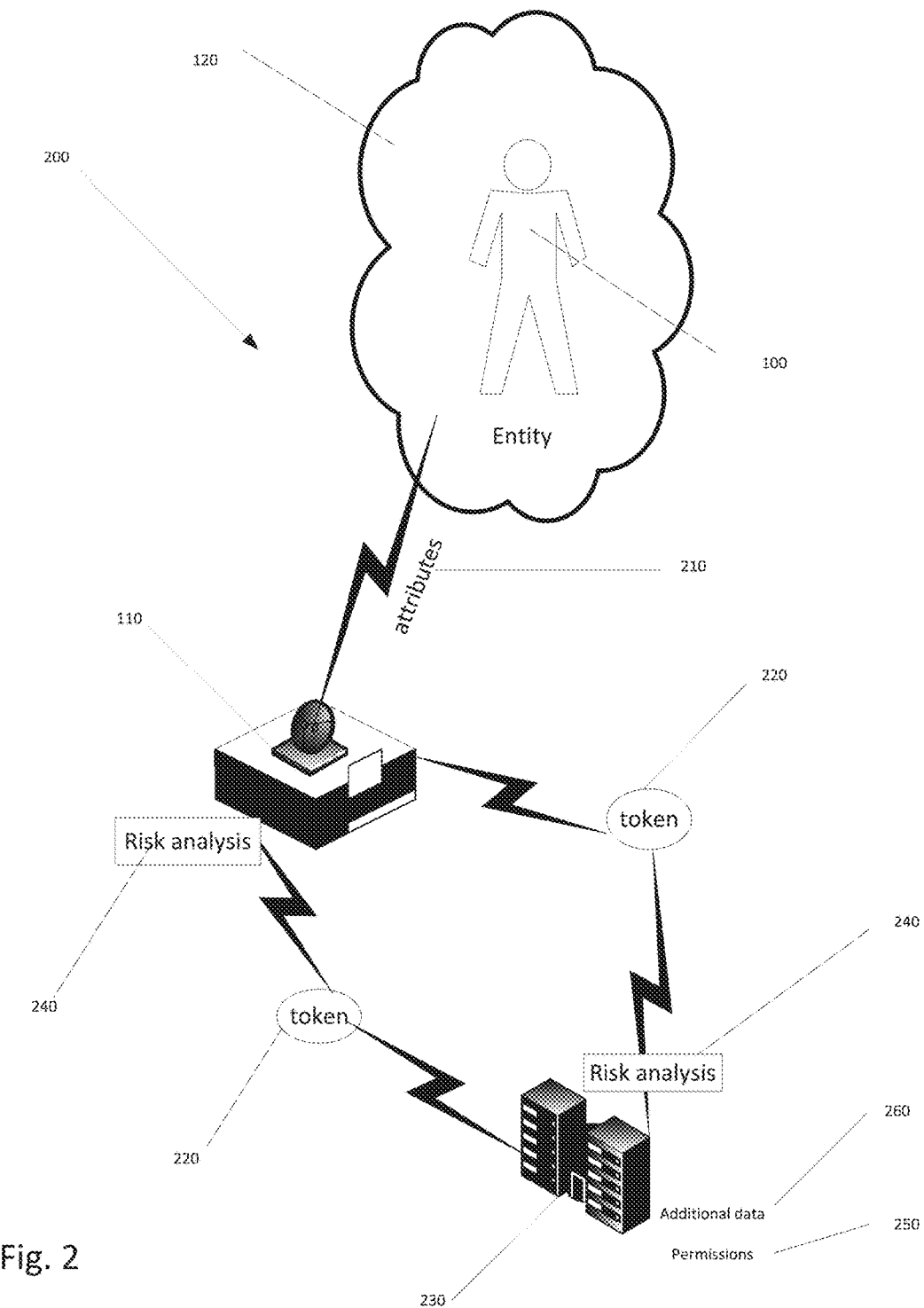
FIG. 2 illustrates an entity with a personal computing network interaction with sensors.

FIG. 2 may be a high level illustration of one embodiment of the proposed system 200. An entity 100 may move in range of a sensor 110 where attributes 210 of the entity may be collected. The attributes 210 may be communicated in the form of tokens 220 from the entity to the sensors 110. In other embodiments, the sensed attributes 210 may be translated into a token 220. The token 220 may then be communicated to a central computing service 230 which may be considered a trusted computing system. The token 220 may be reviewed for fraud or other undesirable characteristics by a risk analysis application 240. Assuming the token 220 is not fraudulent, the central computing system 230 may review the token 220 to determine if the entity 100 has granted permission 250 for the sensor 110 (or operator of the sensor 110) to obtain additional information 260 about the entity 100. If permission 250 has not been granted, the central computing system 230 may be silent or may send a reject message.

Figure 3:
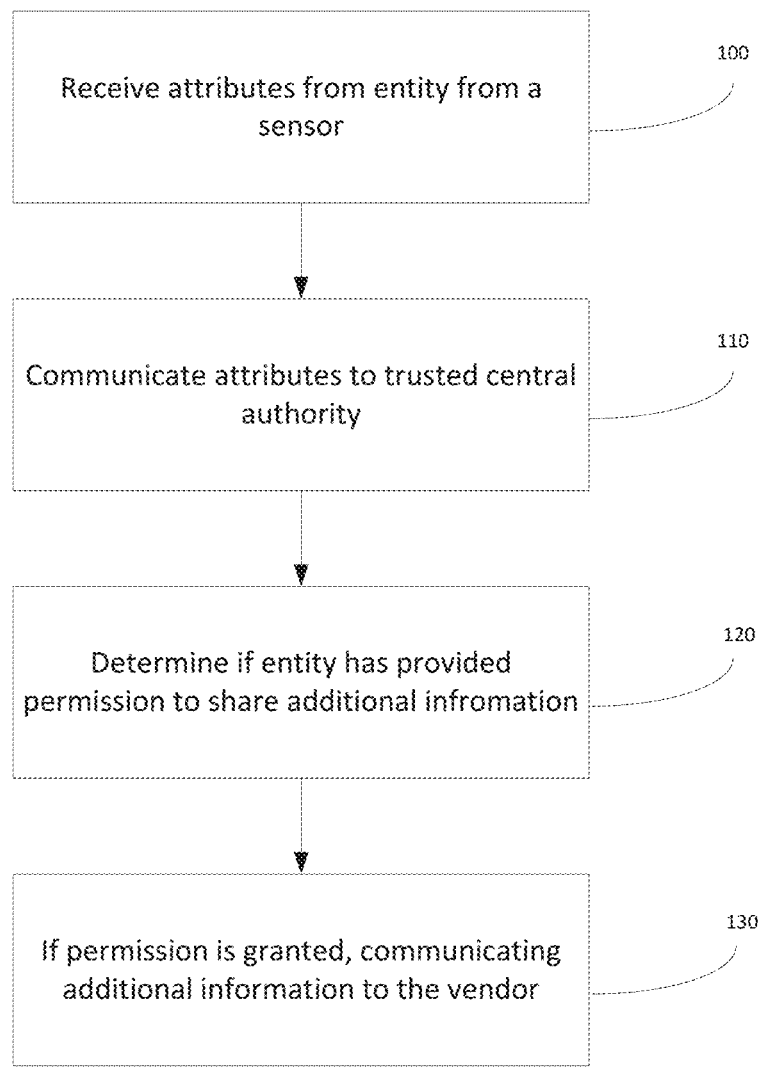
FIG. 3 illustrates a method of controlling access to data about an entity.

More specifically, referring to FIG. 3, a computer based method, process and system for controlling access to data about an entity 100 may be illustrated. At block 100, attribute data 210 may be detected from the entity 100 at a sensory device 110.

Sensory Devices

The sensors 110 may be many and varied. While not trying to be exhaustive or limiting, some examples may include 802.11 wireless communication devices, wireless communication devices in different frequency bands such as infrared communication or 60 MHz, still cameras, video cameras, photonic sensors, Bluetooth communication devices, sound sensors (microphones), smell sensors, heat sensors and any other sensor 110 that may be non-intrusive but able to collect data on an entity 100. The sensors 110 may be designed or intended for a different purpose but may be adapted to communicate with the system 200. For example, a security camera may be initially installed for security purposes but may be adapted to be a sensor 110 in the described system 200.

Of note, wireless communication devices such as WiFi routers are not often thought of as sensors 110. However, communication with wireless devices is often two ways and the entity 100 may have to provide information in order to communicate with the wireless device, even if the communication is to merely collect the name of the wireless device or an identity of the computing device in communication with the wireless device. The name of a device, such as a MAC address, may be enough for a network to identify an entity 100 and begin to communicate targeted advertisements, even when the entity 100 is in communication with a new, unknown network as the MAC address may be matched to previous searches which may be used to guide targeted advertisements. Thus, by controlling the data shared with wireless sources, the entity 100 may take control of its data 260 and ensure the data 260 is shared only when desired.

Logically, an entity 100 may pass through a variety and plurality of sensors 110 in a day and each one of these sensors 110 may want to communicate with the central computing device 230 to determine if more information 260 is available about the entity 100.

Related, the entity attributes 210 change as the entity 100 changes locations and different sensors 110 are in relevant range. For example, an entity 100 may be in a car and may pass through a toll collection apparatus and may pass numerous Bluetooth connections and wireless connections. The car may provide unique attributes as it has a license plate, a distinctive look and may broadcast a unique identifier. Further, the entity 100 may not be wearing a jacket in the car as the climate may be controlled within the car. Later in the day, the entity 100 may exit the car and put on a jacket. Thus the attributes 210 of the car (license plate, color, id number) may no longer be available. However, the attributes 210 of the jacket may now be added. Further, the attributes 210 may change all through the year and through an entity's 100 lifetime.

Attribute Data

Attributes 210 may be detected to help identify entities 100 or differentiate among entities 100. Attributes 210 are wide and varied and may be virtually any item or characteristic that may be sensed by the sensor 110 and used to differentiate among entities 100. Obvious attribute 210 examples may be a face of an entity 100, a MAC address of a portable computing device assigned to an entity 100 or an RF id of a pet. However, the attributes 210 may be less obvious and more obscure as users may not desire that they have created a personal area network 120 of attributes 210. For example, an attribute 210 may include a hand, a piece of jewelry, a fabric, a scent, a sound, etc. Some attributes 210 may be active like a smart phone passing a MAC address, browser configuration, memory size, apps on the device, etc. while other attributes 210 may be passive such as the optical characteristics of a face or hand.

Figure 4:
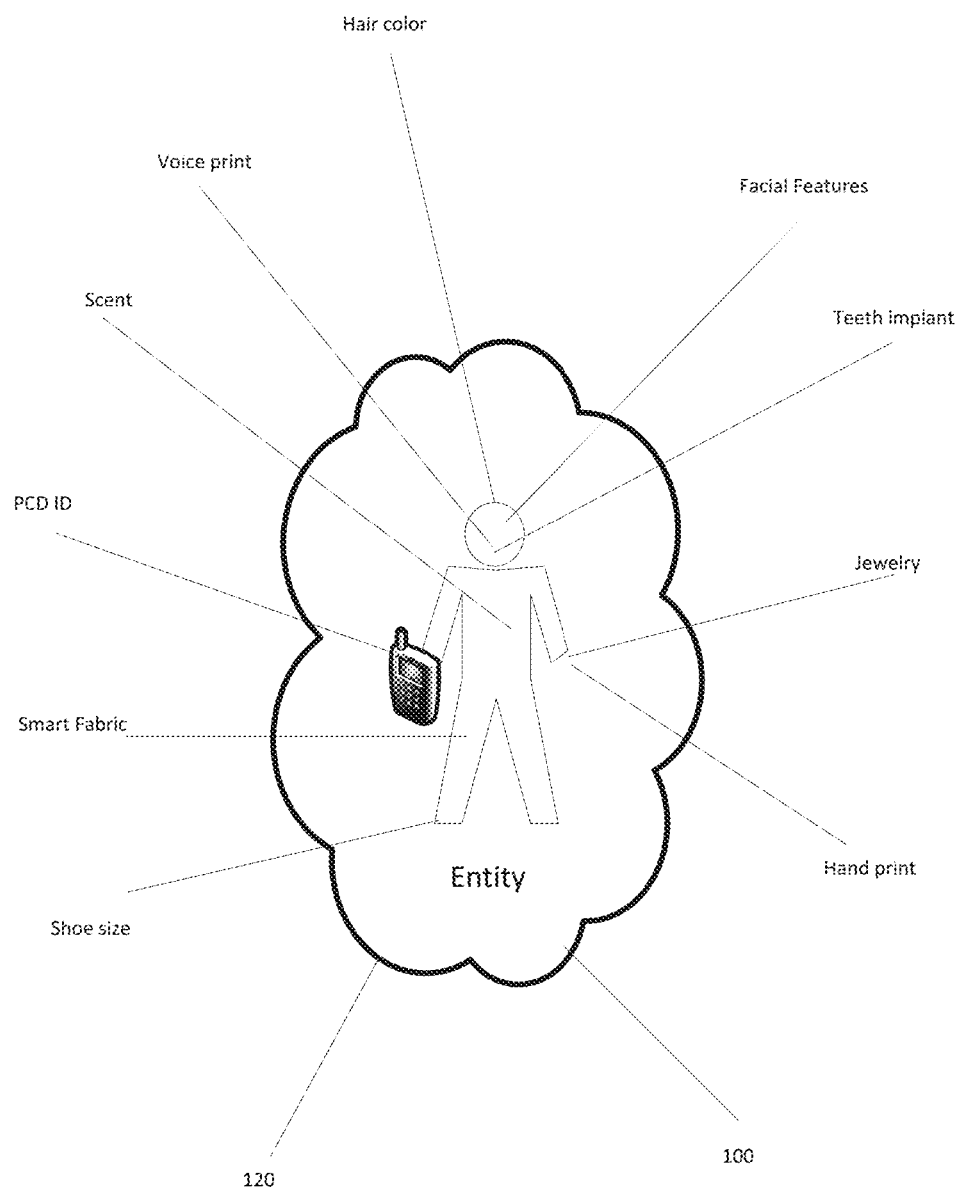
FIG. 4 illustrates some sample attributes of an entity.

Additional attributes 210 may result from purpose created items. As an example, a fabric may provide a given response when exposed to a certain radio frequency. As another example, piece of jewelry may provide a known response when it receives radio waves in a predetermined frequency. In another example, a dental filing may include a device that may provide a known response when it receives radio waves in a known frequency. FIG. 4 may illustrate some sample attributes 120 of an entity 100.

Attributes 210 related to images may take on a variety of dimensions such that recognition may occur in a variety of ways. A first dimension may be a mapping of the spacing of facial features. A second dimension may be added to further determine depth of facial features. A third dimension may be added by using multiple sensors or one sophisticated sensor. The use of multiple dimension may further enable entities to be further recognized with greater accuracy.

Logically, the sensors 110 may be in communication with a computer network such that the image may be communicated to the central authority 230 to be verified. As mentioned previously, the sensed attribute 210 data may be communicated to a central authority 230. In some embodiments, the attribute 210 data may be converted into a compressed form. In some embodiments, the compressed form may be converted into a token 220 that is communicated to the central computing authority 230. In some embodiments, the conversion occurs at the sensor device110. In other embodiments, the conversion happens when the attribute 210 image is communicated to the central authority 230.

The conversion into a token 220 may occur in a variety of ways. At a high level, the tokenization may occur in such a way to obscure the source of the message and the message such as through encryption but allow the message and source to be unencrypted but the trusted central computing system 230. Further, the token 220 may be reviewed by security software or risk analysis applications 240 to ensure that malicious content is not being delivered to the central computing system 230.

Entities

Entities 100 may be any person, organization or thing that may have information 260 that may be considered sensitive or personal. Logically, a person may be considered an entity 100. In addition, a corporation or any other legal organization may be considered an entity 100 as sensitive information 260 about the organization may be available. Further, loosely organized groups may also be considered an entity 100. As an example, a group of friends may play poker every week and the group may be considered an entity 100. Logically, a larger entity 100 may be made up of a group of entities 100. At an even smaller level, each computing device may contain information that may be considered sensitive and each computing device may be considered an entity 100. For example, a user may have a smart phone solely for work purposes and that phone may be a first entity 100 and the user may have a second phone for personal uses which may have very different sensitive data 260 and the second phone may be considered an separate entity 100.

Sensitive Information

What is sensitive data 260 worth protecting may depend on the entity 100. Certain data 260 may be needed to execute fraudulent transactions such as a name and an account number. At the same time, some entities 100 may consider even more information to be sensitive 260 and worthy of being protected. For example, an address or phone number may be considered to be sensitive data 260 to a famous actor while other entities 100 such as a vendor may actively encourage the dissemination of a phone number and an address. Thus, the famous actor may mark the address and phone number as being sensitive 260 and it may only be communicated under direction of the actor. On the opposite extreme, a vendor may share a phone number and an address with as many people as possible. A user interface may be used to enable an entity 100 to specify that certain data is sensitive 260 and should only be shared with permission while other data may be shared to virtually anyone.

Figure 5B:
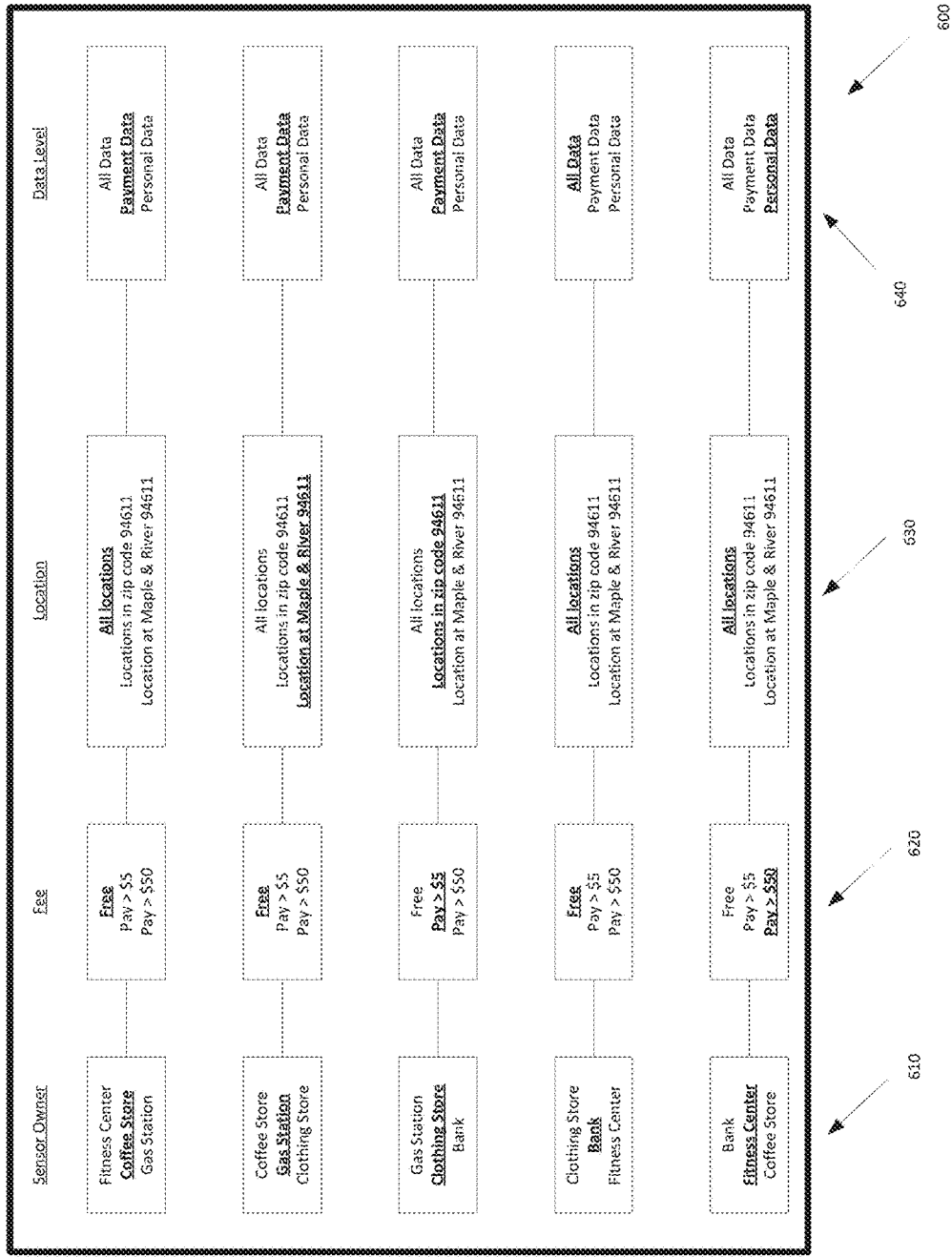
FIG. 5b illustrates an input display for creating permissions for a plurality of entities.

FIG. 5*a* may be an illustration of a display for entering sensitive data 260. Entities 100 may have the option to enter as much or as little information as they desire. For example, a vendor may enter a want to enter lots of information that may be shared with prospective customers while a famous actor that desires privacy may enter the bare minimum necessary to work productively in modern life.

Trusted Computing System

Figure 7:
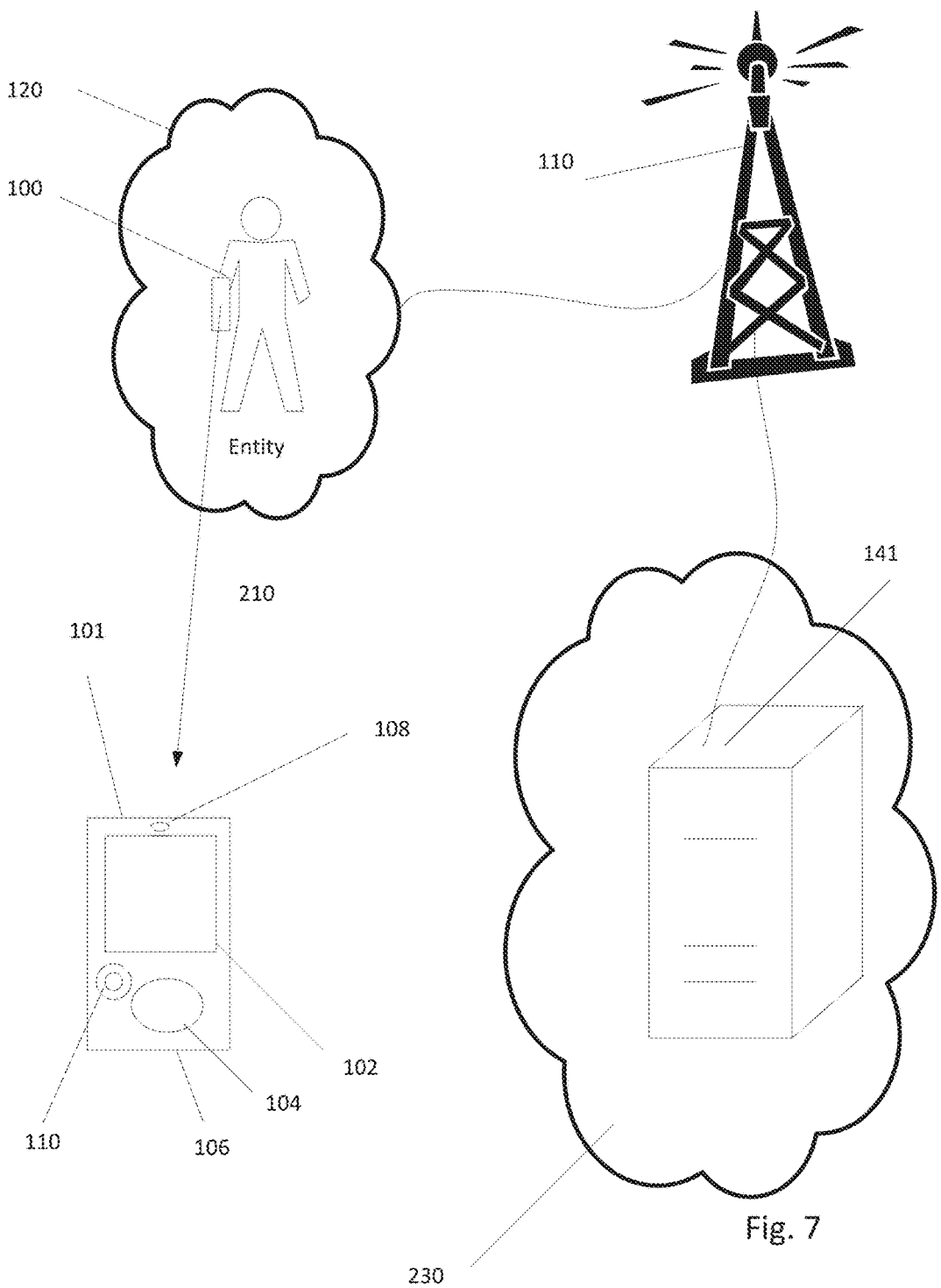
FIG. 7 illustrates an entity with a portable computing device interfacing with a server type computing device.

The computer system 230 may be illustrated in FIG. 7 and may include a trusted computing system that is in communication with a variety of sensors 110. The trusted computing system 230 may also provide an analysis of the tokens 220 to address any concern over fraud. The trusted computing system 230 may be considered the gatekeeper of entity information 260 and unless the entity 100 has authorized the release of information 260 to a sensor 110 (or sensor owner), the sensor 110 is only left with the information it may be able to gather on its own. The computing system 230 may have a single location or may be spread among a variety of locations. To the system 230 users, the system 230 may appear to be a single computer but the system 230 may be spread among a plurality of computing systems 230 which may be spread across the world as a type of cloud computing design.

Figure 8:
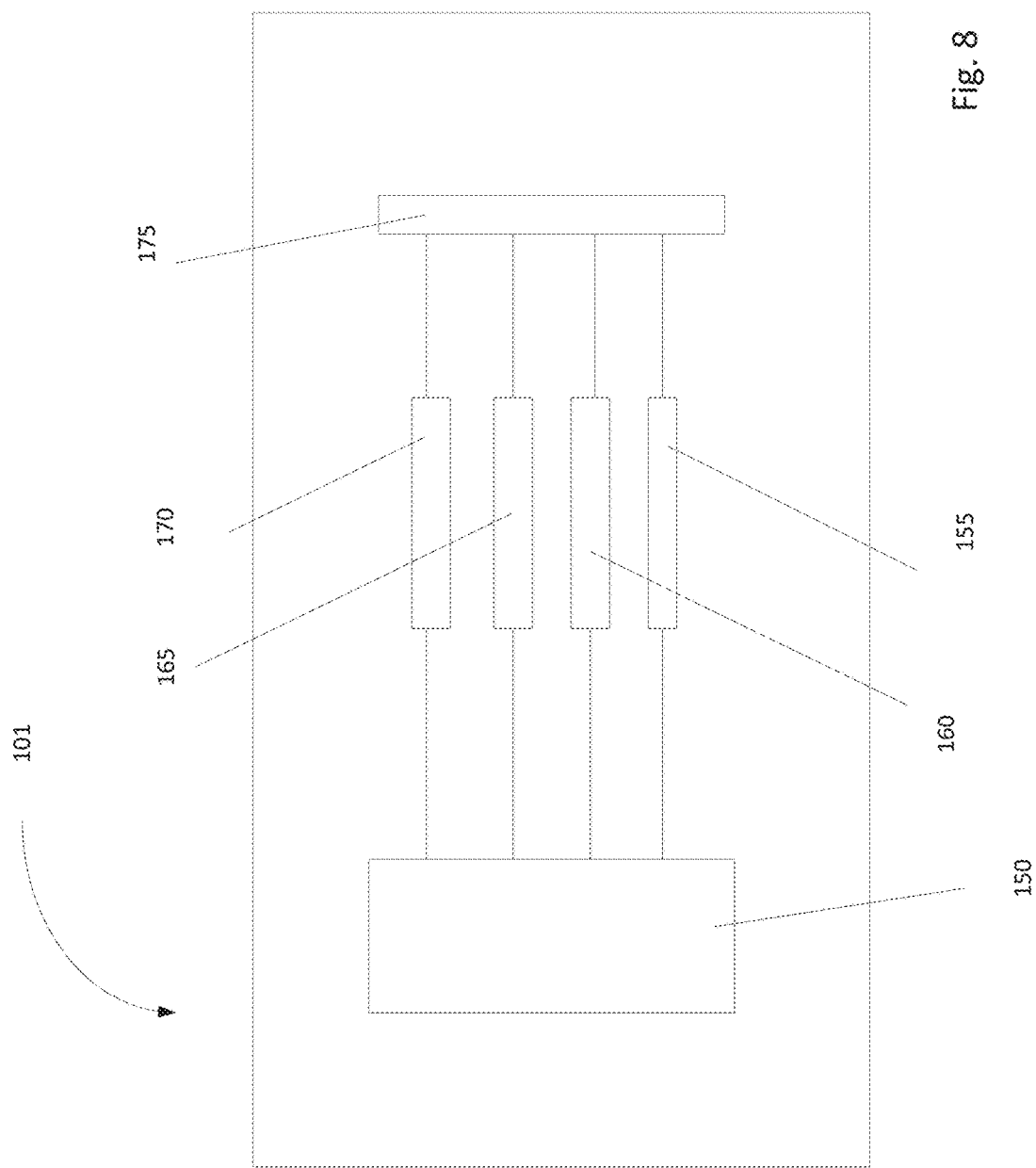
FIG. 8 illustrates a portable computing device.

FIG. 7 may be a high level illustration of some of the elements in a sample computing system 230 that may be physically configured to execute the various embodiments of the method. The computing system 230 may be a dedicated computing device 141, a dedicated portable computing device 101, an application on the computing device 141, an application on the portable computing device 101 or a combination of all of these. FIG. 8 may be a high level illustration of a portable computing device 101 communicating with a remote computing device 141 through a sensor 110 but the application may be stored and accessed in a variety of ways. In addition, the application may be obtained in a variety of ways such as from an app store, from a web site, from a store WiFi system, etc. There may be various versions of the application to take advantage of the benefits of different computing devices, different computing languages and different API platforms.

In one embodiment, a portable computing device 101 may be a device that operates using a portable power source 155 such as a battery (FIG. 8). Referring to FIG. 7, the portable computing device 101 may also have a display 102 which may or may not be a touch sensitive display. More specifically, the display 102 may have a capacitance sensor, for example, that may be used to provide input data to the portable computing device 101. In other embodiments, an input pad 104 such as arrows, scroll wheels, keyboards, etc., may be used to provide inputs to the portable computing device 101. In addition, the portable computing device 101 may have a microphone 106 which may accept and store verbal data, a camera 108 to accept images and a speaker 110 to communicate sounds.

The portable computing device 101 may be able to communicate with a computing device 141 or a plurality of computing devices 141 that make up a cloud of computing devices 111. The portable computing device 101 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the computing device 141 or may be through a communication device or network of devices such as cellular service, through the Internet, through a private network, through Bluetooth, through near field communications, etc. FIG. 8 may be a simplified illustration of the physical elements that make up a portable computing device 101 and FIG. 9 may be a simplified illustration of the physical elements that make up a server type computing device 141.

Referring to FIG. 8, a sample portable computing device 101 may be physically configured according to a method to be part of the system. The portable computing device 101 may have a processor 150 that is physically configured according to computer executable instructions. It may have a portable power supply 155 such as a battery which may be rechargeable. It may also have a sound and video module 160 which assists in displaying video and sound and may turn off when not in use to conserve power and battery life. The portable computing device 101 may also have volatile memory 165 and non-volatile memory 170. There also may be an input/output bus 175 that shuttles data to and from the various user input devices such as the microphone 106, the camera 108 and other inputs 102, etc. It also may control of communicating with the networks, either through wireless or wired devices. Of course, this is just one embodiment of the portable computing device 101 and the number and types of portable computing devices 101 is limited only by the imagination. The portable computing device 101 may act as the display 102 or may be a part of the display 102.

The physical elements that make up the remote computing device 141 may be further illustrated in FIG. 9. At a high level, the computing device 141 may include a digital storage such as a magnetic disk, an optical disk, flash storage, non-volatile storage, etc. Structured data may be stored in the digital storage such as in a database. The server 141 may have a processor 300 that is physically configured according to computer executable instructions. It may also have a sound and video module 305 which assists in displaying video and sound and may turn off when not in use to conserve power and battery life. The server 141 may also have volatile memory 310 and non-volatile memory 315.

The database 325 may be stored in the memory 310 or 315 or may be separate. The database 325 may also be part of a cloud of computing device 141 and may be stored in a distributed manner across a plurality of computing devices 141. There also may be an input/output bus 320 that shuttles data to and from the various user input devices such as the microphone 106, the camera 108, the inputs 102, etc. The input/output bus 320 also may control of communicating with the networks, either through wireless or wired devices. In some embodiments, the application may be on the local computing device 101 and in other embodiments, the application may be remote 141. Of course, this is just one embodiment of the server 141 and the number and types of computing devices 141 is limited only by the imagination.

Referring again to FIG. 3, at block 110, the attribute data 210 may be communicated through a computer network to a trusted computing system 230 to verify the attribute data 210 satisfies permission rules 250 created by the user to permit additional data 260 to be communicated. As mentioned previously, the attribute data 210 may be converted into a token 220 that may be communicated through the network. The conversion may provide comfort to entities 100 that their personal data 260 may not be communicated in a manner that is easily understood by nefarious entities that may attempt to hack into the computer network. The conversion may occur through an encryption type scheme or through another manner such that the additional data 260 may be understood by the trusted computing system 230 but not by others that may have access to the computer network.

Fraud Analysis

Further, as mentioned briefly, the tokens 220 that are communicated through the computer network may be reviewed for security reasons. In this way, attempts to break into the secure computing service 230 may be minimized. For example, the attribute data 210 may be analyzed for fraudulent characteristics. Further, entities 100 that use the system 230 may have more comfort in knowing that messages on the network are being reviewed for security.

The fraud analysis 240 may view the transaction in terms of risk. The tokens 220 and the data represented by the token 220 may be analyzed to determine if the data is more likely to be fraudulent. In addition, the fraud analysis 240 may use neural network or artificial intelligence to continually improve the analysis. For example, the analysis may determine over time that it is impossible for a single user to be in different places at the same time. Similarly, it would be highly likely that someone that is allergic to gluten would be buying products that contained gluten and the analysis may learn this over time.

A plurality of attributes 210 may be examined to determine if a token 220 is fraudulent. For example, a first sensor 110 may observe a first attribute 210 of the entity 100 and a second sensor 110 may observe a second attribute 210 of the entity 100. Both of the attributes 210 observed of the entity 100 may be reviewed and cross-matched to ensure a proper and reliable identification of the entity 100. As an example and not limitation, if a first attribute 210 (facial features) is determined to belong to a first entity 100 but a second attribute 210 (phone MAC address) is determined to belong to a second entity 100, a determination may be made that fraud is likely occurring. Similarly, if a first attribute 210 (hair color) is determined to belong to a first entity 100 and a second attribute 210 (ring RFID signature) is determined to belong to the first entity 100, a determination may be made that fraud is likely not occurring. Logically, the accumulation of attribute data 210 for an entity 100 may occur over a period of time and the attributes 210 observed in close time proximity may be compared to ensure that the same entity 100 is being observed.

The risk service 240 may accumulate the relevant attribute 210 data observed and may perform one or more analysis algorithms to determine if fraud is likely. The risk service 240 may be part of the central trusted computing device 230 but may also examine communications such as tokens 220 that occur over the network. By reviewing communications before reaching the trusted network, nefarious communications may be determined and located even before reaching the trusted server 230.

The risk analysis service 240 may take on a variety of physical forms. In one embodiment, a computing system is physically configured to operate as the risk service 240. Computing chips may be physically configured and installed as part of the risk service 240. In yet another embodiment, the computing chips may be physically configured according to computer executable instructions and the instructions may change or be updated over time. As a result, the computing chips such as a processor or memory may change their physical structure as a result of the updated computer executable instructions.

In yet another embodiment, the risk service 240 may be spread across the network. For example, if a sensor 110 desired to communicate attribute 210 data to the central computing system 230, the attribute data 210 may first have to be analyzed by the risk service 240 which may reside on a computing device 230 at or near the sensor 110 location. In this way, fraudulent or nefarious communications may be stopped before making much inroad into the network.

Permissions

Referring again to FIG. 3, at block 120 at the central computing device 230, the attributes 210 may be analyzed to determine if the entity 100 has preset permissions to allow additional data to be communicated about the entity 100. The entity 100 may use an application with a user interface to determine how and when additional data regarding the entity 100 is communicated to other people that use the network. The permissions 250 may be specified in a variety of ways. In one example, the permissions 250 may be sensor 110 specific. As an example, if an entity consistently buys coffee at the Coffee House at the corner of Maple Avenue and River Road in a Anytown, US, the entity 100 may allow additional information such as payment information to be shared with the video camera (sensor) 110 and related computing equipment for operating the payment system at the Coffee House.

In yet another embodiment, the permission may be more broad and may be location specific. Referring again to the Coffee House example, all the sensors 110 at the Coffee House at Maple & River such as the WiFi system, the video cameras, the still cameras, the scent sensors, etc. may be granted permission to obtain additional information 260 about the entity 100 such as payment information.

In another embodiment, the permission 250 may be sensor 110 owner specific. The entity 100 may trust all the Coffee Houses in the United States and may wish to share additional information with all the Coffee Houses in the United States. In this way, the entity 100 may be able to walk into any Coffee House across the United States and the Coffee House may be able to obtain additional information about the entity 100, including payment information.

As yet a further embodiment, the entity 100 may allow ALL users of the network that serve coffee to have permission to obtain additional information about the entity 100. In this arrangement, the entity 100 may then allow data to be communicated to any coffee serving location and the entity 100 may obtain coffee at any of these locations.

Permission Creation

Figure 6:
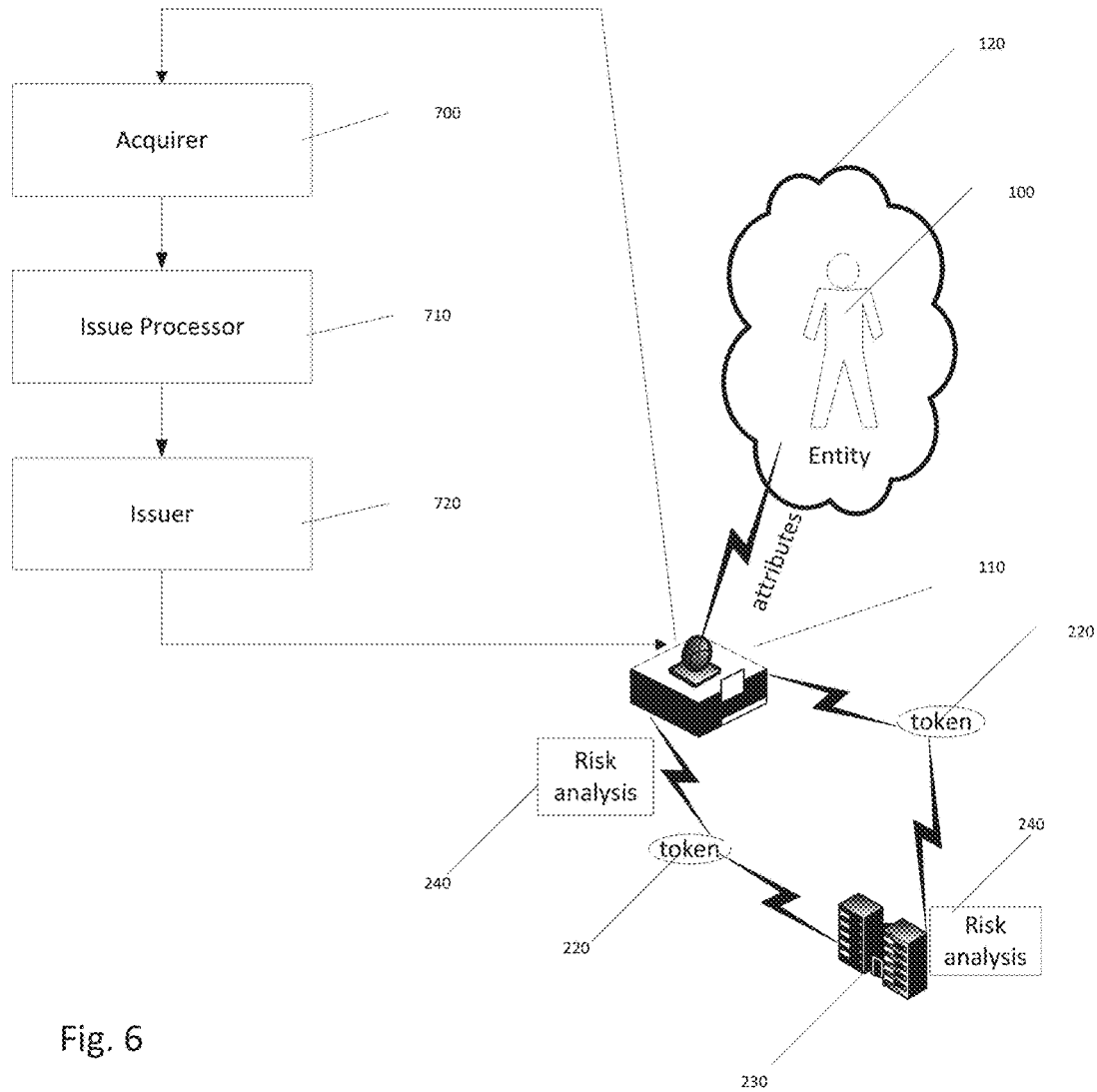
FIG. 6 illustrates a sample illustration of a personal network cloud interacting with a payment system.

FIG. 6 may be an illustration of a sample permission 250 creation display 600. The permission display 600 may be created on any computing device that has network access and is capable of displaying and receiving input information including portable computing devices. There may be a plurality of input fields such as a sensor owner name 610, a fee required to obtain additional data 620, a location to be granted data 630 and a level of permissions 640 which may start at a high level and may allow an entity 100 to make the permissions 250 progressively more specific. Further, permissions 250 that have been created while at vendor/sensor 110 locations may also be listed and may be modified.

Similarly, the entity 100 may set up the permissions 250 while on the go. For example, if a user is at the airport, the user may set the permissions 250 to communicate with limo drivers but not with taxi drivers. As another example, if the user desires Chinese food, the user may set up the permissions to communicate with restaurants that serve Chinese food but not restaurants that serve pizza.

Bidding

In yet another embodiment, the permission 250 rules may set a monetary value minimum and if the sensor 110 owner is willing to pay the monetary value minimum, a token 220 for the additional data 260 may be provided. In this way, the entity 100 may be compensated for sharing additional information 260. Logically, the permission 250 rules may be created in many different ways with a variety of limitations.

As an example, an entity 100 may select to receive offers for discounts from vendors in exchange for releasing some personal information 260. The percentage discount may also be set by the entity 100 and information 260 may only be shared with vendors willing to bid more than the discount percentage. As yet another example, an entity 100 may select to receive a benefit (discount, compensation, special offers) in exchange for only receiving advertisements (or setting up payment) at a single vendor or vendor line for a period of time. If the offer from the vendor does not meet a threshold, the offer may be rejected and the data 260 on the entity 100 may continue to remain private.

Additional Data

Referring again to FIG. 3, at block 130, if permission is granted, additional information 260 may be communicated. The additional data 260 may take on a variety of forms or levels and the form and level may be set by the entity 100. As mentioned previously, what one entity 100 considers to be private or sensitive data 260 may vary depending on the entity 100 and these factors may be reflected in the permissions 250 set and the data 260 that is willing to be shared. Further, some entities 100 may have more additional data 260 to provide than other entities 100.

As one example, the additional data 260 may include data regarding the entity's 100 income level which the vendor may be able to use determine if the entity 100 is likely to be a customer. In another example, the additional data 260 may include payment information data such as whether the entity 100 has a valid account or whether the account has room for additional purchases. The entity 100 may set the level of additional data in advance. For example, the entity 100 may determine that a vendor willing to pay $5 may see a zip code related to an entity 100 and a vendor willing to pay $50 may view income level information about the entity 100.

In some embodiments, the level of information 260 may be set by the entity 100 while at the vendor. As an example, an entity 100 may wander into a new store for which the entity 100 has not set up a permission level and the entity 100 may desire to make a purchase at the vendor. The entity 100 may look into a security camera (sensor 110) where the security camera 110 may communicate the image as authentication data at the central server 230. The authentication data, which may include the image and WiFi obtained data, may be validated as being non-fraudulent. The entity 100, through one of the sensors 110, may indicate to the central authority 230 the entity 100 grants permission 250 to purchase data to be communicated to the vendor.

The entity 100 may make the indication in a variety of ways which may be preset by the entity 100. For example, the entity 100 may preset that a deliberate thumbs up gesture may mean that permission is granted for payment data 260 to be communicated to this vendor. As another example, the user may speak a preset phrase into the camera 110 which may also have sound capabilities, the sound and image may be verified as attributes 210 and the payment data 260 may then be communicated to the vendor. As yet another example, the entity 100 may use a portable computing device such as a smart phone to communicate to the central authority 230 that payment data may be communicated to a specific vendor.

Communication/Tokens

As previously mentioned, the communication may be to a trusted domain. The communication may be in the form of tokens 220. In some embodiments, the tokens 220 are passed from the entity 100 to the sensor 110 where the tokens 220 are then communicated to the trusted authority 230.

In yet another embodiment, the token 220 is communicated in a form of entity name.domain where domain may be the name of the trusted network provider. In yet another embodiment, the token 220 may be communicated in a form of token.domain where the domain may be the name of the trusted network provider. In some versions of the Internet Protocol, the token 220 itself may be part of the address and the token 220 may be dynamic.

If the token 220 is accepted and permission is granted for additional communication, then future communications may proceed in an encrypted manner or in another secure and efficient format. The communication from the central computing system 230 to the sensor 110 with the results of the determination if permission is granted may be in the form of a token 220. The token 220 may indicate the level of data the entity 100 has permitted the vendor or sensor 110 owner to view. The token 220 may also contain some preliminary information about the entity 100 if permission was granted and the vendor/sensor owner 110 may then decide whether additional data 260 would be useful. Related, in the situations where bidding or a payment is required to obtain additional information 260, the relevant cost for the information 260 or the current bid status may be communicated as part of the token 220.

In some embodiments, all of the communication takes place using tokens 220. To reduce fraud, the various tokens 220 may be dynamic. For example, the entity 100 may communicate a first token 220 to a first sensor 110 and may communicate a different token 220 to a different sensor 110. In this way, a vendor cannot use a previous token 220 to attempt to communicate with an entity 100. As long as the token 220 may be understood by the trusted computing system 230, the token 220 may change or be dynamic. For example, the token 220 may change according to a clock which synchronizes the central computer 230 and the sensors 110. In addition, as mentioned previously, all the communication to the trusted computing system 230 may be reviewed for fraud or anomalies by the risk analysis system 240.

In yet another embodiment as illustrated in FIG. 6, the tokens 220 may enable a transaction over a traditional payment network. An entity 100 may establish trust with a sensor 110 or vendor. Assuming the entity 100 has granted access to payment information 260, the payment information 260 stored in the trusted computing store 230 may be communicated through the traditional payment network such as through the acquirer 700 to the issuer processor 710 and then to the issuer 720. In yet another embodiment, the payment information may remain in the trusted computing store 230 and a token 220 that represents payment information may be passed through the traditional payment system 700-720 where it may be recognized and used to access the relevant payment information 260. In this embodiment, the payment information 260 may be kept within the secure system, thereby reducing risk.

The tokens 220 may be exchanged for a variety of purposes. In one example, a token 220 may permit a transaction to occur. In another example, the token 220 may allow additional information to be delivered. In yet another embodiment, the token 220 may deny additional information 260. Further, the token 220 may indicate that fraud may be occurring and that the present inquiry is likely fraudulent.

Fee Split

In yet another aspect, a first vendor/sensor owner 110 may be responsible for drawing entities 100 to a particular geographic location. As an example, an ice cream store may be responsible for drawing large crowds during warm days.

The crowds may also shop at additional vendors 110 after buying ice cream. A percentage of sales by the additional vendors 110 may be shared to the first vendor 110. The transfer of funds may also use the trusted computing network 230 as vendors/sensor owners 110 may also be members of the trusted computing system 230. In some embodiments, the shared percentage may be negotiated among the parties. In another embodiment, the increase in sales by the additional vendors may be determined and may be automatically be apportioned.

In another embodiment, a sensor 110 owner may be a primary sensor 110 owner and the primary sensor 110 owner may receive compensation from secondary sensor 110 owners in a logical proximity to the primary sensor 110 owner if a transaction occurs. The sensors 110 of the various vendors 110 may track the movements of customers and if the customers were drawn to a first vendor/sensor owner and then makes purchases at additional stores, the additional stores may share a portion of the revenue with the primary vendor.

Transaction Review

The system may also provide additional abilities for entities 100 to challenge fraudulent charges. As the entity 100 likely encountered numerous sensors 110 before enacting a transaction, there may be numerous inquiries at the central computing location whether an entity 100 has agreed to provide additional information. If a purchase is made and the additional inquiries were not made, the probability that fraud occurred is higher. Similarly, if fraud did occur, it is likely the person that committed the fraud was sensed by numerous sensors 110 on the network. The sensed attributes 210 of the fraud perpetrator may be used to chase down the fraud. Further, the sensed data may be used to illustrate the entity 110 may have been at a different location when the purchase was made. As the personal cloud 120 will have many unique attributes, it will be especially difficult to replicate. Similarly, if a fraudster tries to duplicate the attributes 210 of a personal network 120, some of the attributes 210 of the fraudster may be obtained and may be used to trace the fraudster.

Communication Through Trusted Network (Email)

Another aspect is that the entity 100 may use the network to do more than make purchases. An entity 100 may set permissions 250 such that the entity 100 may be recognized and can access additional functionality of the network. As an example, an entity 100 may give permission for certain vendors to have access to personal data 260. Once the entity 100 is verified, the entity 100 may use the sensor 110 as a sort of input device to the secure computing network 230 to perform tasks like any computing system. The entity 100 may look into a security camera 110 and request that an email be sent to her assistant that her train is late. Similarly, the entity 100 may use the camera or other sensor 110 like an input into a computing device and virtually all the options available using a computer may be available.

In yet another aspect, the entity 100 may use a sensor 110 such as a camera in a portable computing device 101 to create a task and the task may be executed at a time in the future when adequate computer network access is available. For example, the entity 100 may be on public transportation and may wish to create a new level of permissions for a store. The user may create and store a message using the image sensor 108 on the portable computing device 101 and once the user is off public transportation and near satisfactory computing network access, the message may be sent.

As yet an another example, a vendor may set up a communication spot similar to a phone booth. In the communication spot, an entity 100 like a customer may have privacy and may access private information all after being recognized by the system. For example, an entity 100 may be recognized by appropriate attributes 210 and may access its email in the communication spot. Similarly, an entity 100 may request a map to an additional store and the map may be displayed in the communication spot. Further, the map (or other computer based object) may be downloaded to another computing device associated with the entity 100 such as a portable computing device 101. As another example, an entity may look at a camera and request a change in access for a specific vendor in question such as allowing the vendor to have access to payment data.

The trusted network may be a public network such as the Internet with sufficient safeguards or it may be a private network or a combination of public and private networks with appropriate security applied. If the network is a private network such as a payment processing network, entities may have more faith that their personal and sensitive information is being stored and maintained in a secure fashion and thus the entities may be more likely to take advantage of more aspects of the system.

Conclusion

The described network, process and system may allow entities 100 to better control access to sensitive data 260 about the entity 100. Instead of multiple parties collecting data 260 and using it as the parties see fit, the entity 100 will have control of such data. The entity 100 may then use the data 260 as the entity 100 sees fit, from authorizing payments, to accepting bids for additional information to denying access to such information 260.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The invention claimed is:

1. A computer based system for controlling access to data about a person comprising:
    detecting attribute data that differentiates the person from another person by sensing physical attributes associated with the person in a physical environment at a sensory device, the sensory device associated with a sensor owner who is separate from the person;
    communicating the attribute data from the sensory device through a computer network to a trusted verification service on a central computer to verify the attribute data satisfies permission rules created by the person to permit additional data to be communicated;
    generating at the central computer, a token in response to the attribute data being verified, the token comprising permission for the sensory device to obtain the additional information; and
    in response to the attribute data being verified, providing the token from the central computer via the computer network to the sensory device; and
    extracting, from the token at the sensory device, at least a portion of the additional information about the person for which permission was granted.

2. The system of claim 1, wherein the attribute data is analyzed for fraudulent characteristics.

3. The system of claim 1, wherein attribute data comprises at least one selected from the group comprising a mobile computing device related data, a smart material, a face, a hand, jewelry, iris scan, and a heart signal.

4. The system of claim 1, wherein the sensor device sense at least one of the group comprising wireless signal attributes, optical attributes, sound attributes, smell attributes, and photonic attributes.

5. The system of claim 4, wherein the optical attributes are in one dimension, two dimensions or three dimensions.

6. The system of claim 5, wherein optical attributes comprising sensing a fabric designed to emit a signal that is detectable by the sensor.

7. The system of claim 1, wherein the permission rules are network specific.

8. The system of claim 7, wherein the permission rules are set according to the owner.

9. The system of claim 1, wherein the permission rules set a monetary value minimum and if the owner is willing to pay the monetary value minimum, a token for the additional data is provided.

10. The system of claim 1, where the person is in communication with a plurality of sensors and moves through a variety of sensors.

11. The system of claim 1, wherein the communication is to a trusted domain.

12. The system of claim 1, wherein the communication comprises at least one token and the token is reviewed for fraud or anomalies.

13. The system of claim 1, wherein the approved transactions flow through a traditional payment network.

14. The system of claim 1, wherein communication of the tokens enables a transaction for value.

15. The system of claim 1, wherein the entity communicates an entity approved message through the sensors.

16. The system of claim 1, wherein the sensory device is a video camera.

17. A method of operating a sensor comprising:
designating separate protection levels to personal information about an entity for a plurality of sensor owners, the personal information stored at a central computing system;
receiving attribute data about an entity at the sensor, the sensor adapted to create a token related to the entity;
sending the token and an identification of an owner of the sensor from the sensor to the central computing system;
receiving, at the sensor, a return token from the central computing system, the return token containing at least a portion of the personal information corresponding to a protection level designated for the sensor owner; and
interacting with the entity according to the at least the portion of the personal information received at the sensor.

* * * * *